(12) United States Patent
Park et al.

(10) Patent No.: US 7,945,540 B2
(45) Date of Patent: May 17, 2011

(54) METHOD TO CREATE A PARTITION-BY TIME/TUPLE-BASED WINDOW IN AN EVENT PROCESSING SERVICE

(75) Inventors: Hoyong Park, San Jose, CA (US); Namit Jain, Santa Clara, CA (US); Anand Srinivasan, Bangalore (IN); Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 225 days.

(21) Appl. No.: 11/867,471

(22) Filed: Oct. 4, 2007

(65) Prior Publication Data

US 2008/0275891 A1    Nov. 6, 2008

Related U.S. Application Data

(60) Provisional application No. 60/927,737, filed on May 4, 2007.

(51) Int. Cl.
*G06F 17/30* (2006.01)
(52) U.S. Cl. .................. 707/692; 707/610; 707/769
(58) Field of Classification Search .............. 707/1, 6, 707/8, 100, 104.1, 200, 201, 202, 205, 206, 707/609, 610, 618, 625, 654, 669, 681, 689, 707/692, 693, 812, 813, 821, 662–664, 769, 707/999.006, 999.007, 999.201; 705/1, 10, 22, 23, 24, 1.1
See application file for complete search history.

(56) References Cited

U.S. PATENT DOCUMENTS

| | | | |
|---|---|---|---|
| 5,708,796 A * | 1/1998 | Ozden et al. .................. 711/167 |
| 6,801,938 B1 * | 10/2004 | Bookman et al. .............. 709/224 |
| 7,437,397 B1 * | 10/2008 | Koudas et al. ................ 708/422 |
| 2006/0064416 A1 * | 3/2006 | Sim-Tang ........................ 707/6 |
| 2006/0106867 A1 * | 5/2006 | Burges et al. ............... 707/104.1 |
| 2008/0263096 A1 * | 10/2008 | Klein et al. ................ 707/104.1 |

* cited by examiner

*Primary Examiner* — Greta L Robinson
(74) *Attorney, Agent, or Firm* — Hickman Palermo Truong & Becker LLP

(57) ABSTRACT

A method to create a partition by time/tuple based window in an event processing service is provided. When continuous data streams are received, tuples are stored in a data structure with partitions based upon partition keys. Only a specified amount of tuples may be stored in each partition. When a partition exceeds the specified number of tuples, the oldest tuples are removed from the data structure. Tuples stored beyond a specified time period are also removed from the data structure. Two data structures may also be used to implement a time/tuple based window. Tuples are stored in both a data structure with a partition by window and a data structure with a range window. Tuples are removed in the partition by window when tuples exceed the amount in the partition. Tuples are removed in the range window when tuples exceed a specified time period. The two data structures are synchronized.

22 Claims, 4 Drawing Sheets

101 TIME-BASED SLIDING WINDOW t-10 SECONDS
109

107 t
111

113 TUPLE-BASED SLIDING WINDOW

123

119
10 TUPLES t
121

125 PARTITION-BY SLIDING WINDOW 139
10 TUPLES

141

PARTITION-BY TIME AND TUPLE WINDOW

METHOD TO CREATE A PARTITION-BY TIME/TUPLE-BASED WINDOW IN AN EVENT PROCESSING SERVICE

CROSS REFERENCE TO RELATED APPLICATION

This application claims the benefit of priority to U.S. Provisional Patent Application No. 60/927,737 filed on May 4, 2007, which is incorporated by reference in its entirety for all purposes as if originally set forth herein.

FIELD OF THE INVENTION

The present invention relates to managing continuous data streams, and more specifically, processing events using partitions and windows in those streams.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In applications such as stock quote monitoring, automobile traffic monitoring, and data sensing, data is in the form of continuous data streams. A continuous data stream is a stream of data that arrives at a stream processing server with no explicit end range. Continuous data streams comprise of a plurality of tuples. As used herein, "tuples" have the same series of attributes but not necessarily the same attribute values for those attributes. Each tuple is also associated with a particular time. A tuple may also be referred to as a single row or record in a relational database.

Processing the continuous data streams is often referred to as "event stream processing" because the goal when analyzing these data streams may be to identify meaningful events within those streams. Techniques may be employed to detect complex patterns, event correlations, and relationships between events. For example, a continuous data stream might have information about automobiles that pass a particular section on a highway. A sensor detects automobiles that pass the particular section of highway and sends data that might indicate the type of automobile, the speed of the automobile, and the time that the automobile was on the particular section. Based upon this data stream, events such as heavy traffic congestion (indicated by slow average speeds of automobiles) may be detected.

Traditional database systems and data processing algorithms are designed to process data stored as finite stored data sets. Traditional database systems store data in database tables where the data may be queried and manipulated using a data management language such as SQL. Database management systems and algorithms are unable to handle continuous data streams because they are designed based upon the assumption that the system stores a large, but finite, collection of data. Continuous data streams, by contrast, have no explicit end range and storing the data may be impractical with the large amounts of data that is continually sent.

Applications for continuous data streams have become increasingly prevalent because of the growing number of networks used for monitoring and sensing actions. As a result, the ability to process and handle large volumes of continuous data streams arriving in real-time and to be able to deliver results in a timely fashion have become very important.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
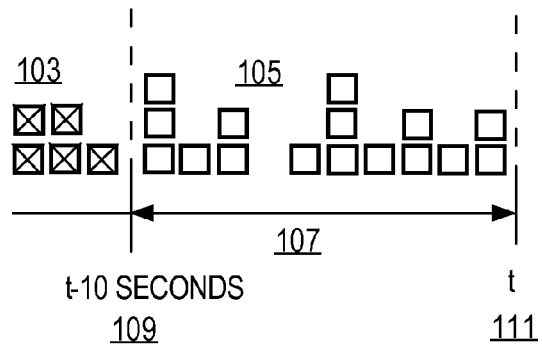
FIG. 1 is a diagram displaying an example of a time-based sliding window, a tuple-based sliding window, and a partition-by sliding window, based on prior art.
Figure 1:
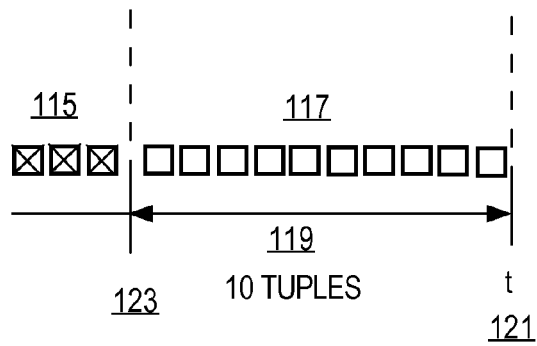
Figure 1:
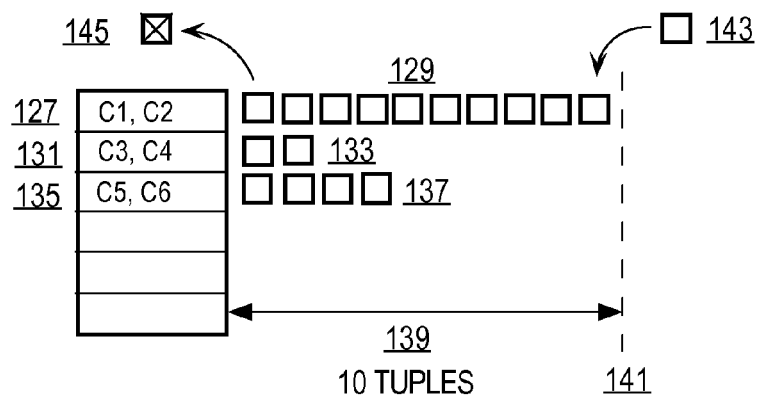

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are approaches to create a partition-by time/tuple-based sliding window in an event processing service.

Processing Continuous Data Streams

In continuous data streams, the data received is not a finite amount of data. Rather, data is received continuously by a stream processing server. As used herein, a "stream processing server" is a server that receives and processes tuples from continuous data streams. A continuous data stream is a continuous flow of tuples, each tuple having the same series of attributes but not necessarily the same attribute values for those attributes. Each tuple is also associated with a particular time. As used herein, a particular time may indicate when an event occurred and is represented by an identification number, a time stamp, or any other information that represents time.

In an embodiment, the particular time associated with a tuple is application specific. The particular time may reference the time that an event occurred, or refer to the order of occurrence of the events. For example, if automobiles were monitored passing a section of highway, then the particular time associated with the tuple that indicates the event of an automobile passing may indicate the order that automobiles passed. Thus, the tuple that refers to the first automobile that is monitored passing might have an identification number of "1." The tuple referring to the second automobile that is monitored passing might have an identification number of "2" and so forth.

Alternatively, the particular time associated with tuples that indicate the event of an automobile passing may indicate the time that automobiles pass the section of highway. Thus, when an automobile is monitored passing the section of highway, the time that the automobile passed might be the particular time associated with the tuple such as "15:49 07/09/ 2007". This particular time represents 3:49 P.M. on Jul. 9, 2007.

In an embodiment, the particular time associated with the tuples is a non-decreasing number. Tuples generated after earlier-generated tuples may not be associated with an earlier time. Thus, if the particular time associated with a tuple is an identification number, then tuples that are generated after a certain tuple may not have an identification number that decreases from the certain tuple. In addition, if the particular time associated with a tuple is a time stamp, then tuples that are generated after a certain tuple may not have a time stamp that is an earlier time than the certain tuple. In an embodiment, multiple tuples may have the same associated particular time if the events indicated by the tuples occurred at the same time.

A task that may be performed with continuous query streams is to query for a particular event. In anomaly detection, a query is made to alert the user when a particular error has occurred or a particular event happened. For example, a continuous data stream might monitor the temperature in a certain environment. A user may wish to know when the temperature in the environment is out of a certain range. If the temperature is between 20° C. and 40° C., then the environment is in the normal range. However, if the temperature falls below 20° C., or rises above 40° C., then an anomalous event has occurred. One application with continuous data streams may be to determine the number of anomalous events that have occurred in the previous hour. In order to process this query, the query needs to compare and combine stored, historical data with real-time streaming data.

Because continuous data streams are not finite and may not be easily stored within a database table, different languages are used that are similar to SQL but able to process continuous data streams. For example, PERL script is adapted to process continuous data streams. CQL, or continuous query language, is a SQL-based declarative language used to register continuous queries against data streams.

CQL allows a stream processing server to perform primitive operations on the stream of data as the data is received. These operators are able to act on a single tuple at a time. When a CQL query is registered with the stream processing server, the server evaluates each tuple as the tuple is received by the server based upon the instructions located in the query. Based upon the implementation, the stream of data may be stored or discarded when the query evaluation is complete.

In an embodiment, a query conforming to CQL and the query is evaluated each time new data in the form of tuples is received. A query may return a determination of whether certain criteria, such as temperature in a particular range, are satisfied. In searching for anomalous events, an anomalous event may be indicated by an evaluated query that is not satisfied. To determine the anomalous event, results of the evaluated queries are examined to find instances where the evaluated query is not satisfied.

Another example of an application of a continuous data stream is to collate and process data for a certain time range. For example, a query may be formulated to obtain the average temperature in a particular environment for the previous ten minutes. Under this circumstance, a continuous data stream might send tuples comprising data named "temp" and an associated particular time. The "temp" data indicates the temperature at the particular time. The following statement might be used for the query:

Select avg (temp) from temp [range 10].
The query finds the average of the "temp" data over a range of "10." In this example, a range of "10" indicates 10 minutes. In other embodiments, the range may indicate seconds, days, or any other specified time period. The query evaluates tuples received in the previous ten minutes and finds the average temperature. "Expired" tuples, or those tuples that are received previous to the indicated range are disregarded by the query, and may therefore be freed by the stream processing server. Thus, CQL queries may not need to account for and store all continuous data, just process a certain portion of data. This minimizes storage and overhead using CQL queries.

Time-Based Sliding Window

Several different methods may be used in order to create bounds on continuous data streams. These sets of tuples in the bounded data may be referred to herein as a "relation." In an embodiment, in order to create bounds on continuous data streams based upon the time that data is received, a time-based sliding window may be used. As used herein, a "time-based sliding window" creates a data set that comprises the tuples received in a specified previous time range. A specified time may be the previous ten minutes, ten seconds, or any other identifiable time period. The window "slides" as new tuples are received into the relation and older, expired tuples are removed once these tuples are no longer located within the specified time range.

In FIG. 1, an example of a time-based window, according to an embodiment, is shown as 101. In the example, the range 107 is ten seconds. Thus, under this circumstance, the bounded set or relation is the tuples received in the previous ten seconds. The bounded set is shown as tuples 105 between the dotted boundaries. The range 107, is between the boundary of "t" 111 that shows the current time, and the boundary of "t-10 seconds" 109 that shows the time boundary of the range. Multiple tuples may be received at the same time and alternatively, no tuples may be received for a certain time. There is no limit, other than storage capacity, to the amount of tuples that may be received in the range. If a tuple is received previous to the specified range 107 as the window slides, then the tuple is considered expired and then discarded. Expired tuples 103, are shown with an "X" and are located to the left of the "t-10 seconds" boundary 109. A time-based sliding window might be used, for example, where the average temperature is to be determined for a range of the last ten minutes.

Tuple-Based Sliding Window

In an embodiment, a continuous data stream may be bounded by a tuple or row-based sliding window. A tuple-based sliding window creates a data set or relation that comprises a specified number of tuples previously received. The specified number of tuples may be any whole number. The window "slides" as new tuples are received into the window and older, expired tuples are removed once these tuples are no longer located within the specified tuple range. A tuple-based sliding window only holds a specified number of tuples and the oldest tuples in the range are removed as newer tuples are received. Thus if tuples are received at a fast rate, then the age of the oldest tuple may be very short. If tuples are received slowly, such as once per day, then the age of the oldest tuple would be ten days.

In FIG. 1, an example of a tuple-based sliding window, according to an embodiment, is shown as 113. The tuple-based window has a range 119 of ten tuples. The number of tuples in the range may vary from implementation to implementation. The bounded set or relation is shown as tuples 117 between the dotted boundaries. The "t" boundary 121 indicates the current time when newly received tuples are stored. The left boundary 123 indicates the boundary that marks the end of the range 119. Expired tuples 115, or tuples that are have been received prior to the tuple range, are discarded and are marked with an "X."

A tuple-based sliding window may be used, for example, where one is interested in the last 100 automobiles that have passed a segment of a freeway, regardless of when the automobiles have passed. Each tuple represents an automobile passing. In this particular circumstance, a tuple-based sliding window may be used with a range of 100 tuples.

Partition-By Sliding Window

In an embodiment, a bounded set may be created with a partition-by sliding window. In a partition-by sliding window, tuples are partitioned by a partition key that corresponds to a data value comprised in the tuple. Each tuple is stored in a partition that corresponds to the data value in the tuple. For each partition, a specified number of tuples may be stored. The specified number of tuples is similar to the specified number of tuples in a tuple-based window but is applied to each partition in a partition-by sliding window.

In FIG. 1, an example of a partition-by sliding window, according to an embodiment, is shown as 125. In the partition-by window, tuples are stored based upon partition keys. Partition "C1, C2" 127 is the first partition. Tuples that correspond to the partition key "C1, C2" 129 are stored in the first partition. Partition "C3, C4" 131 is the second partition. Tuples that correspond to the partition key "C3, C4" 133 are stored in the second partition. Partition "C5, C6" 135 is the third partition. Tuples that correspond to the partition key "C5, C6" 137 are stored in the third partition. The partition-by sliding window has a specified range 139 of ten tuples for each of the partitions, which is a user specifiable parameter. Thus, each partition may only store ten tuples. If a new tuple is to be appended to a partition that already is storing ten tuples, then the oldest tuple in the partition is expired and discarded. The "t" boundary 141 indicates the current time and where the newly received tuples are appended. When a newly received tuple 143 enters a partition that already contains the maximum specified number of tuples, the oldest tuple 145 becomes expired and is discarded.

An example of an application of for a partition-by sliding window is where a continuous data stream comprises stock quotes marked by the data "stock symbol" and the data "current price." The continuous data stream may be partitioned by the data "stock symbols." The first partition key might be "ORCL," which is the stock symbol of Oracle Corporation and the second partition key might be "YHOO," which is the stock symbol of Yahoo!, Inc. The tuples that contain the data "ORCL" as the stock symbol would be stored in the first or "ORCL" partition and the tuples that contain the data "YHOO" as the stock symbol would be stored in the second or "YHOO" partition.

The number of tuples to be stored in each partition is specified. For example, if the number of tuples that may be stored is twenty, then up to twenty tuples in the first or "ORCL" partition may be stored with tuples containing the data "ORCL" as the stock symbol. If there were already twenty tuples in the first or "ORCL" partition and a new tuple containing the data "ORCL" as a stock symbol is received, then the oldest tuple in the "ORCL" partition would be expired and removed and the new tuple would be appended to the partition.

Partition-By Time/Tuple-Based Sliding Window

In an embodiment, a bounded set may be created with a partition-by time/tuple-based sliding window. In a partition-by time/tuple-based sliding window, tuples are partitioned by a partition key that corresponds to a data value contained in the tuple. Each tuple is stored in a partition that corresponds to the data value in the tuple. As used herein, storing may refer to storing the data that represents the tuple or storing a pointer to the data that represents the tuple. For each partition, a specified number of tuples may be stored. The specified number of tuples is similar to the specified number of tuples in a tuple-based window but is applied to each partition in a partition-by sliding window. In addition, tuples stored in the partitions are removed if the tuples have been received prior to a specified time range. The specified time range may be the previous ten seconds, ten minutes, or any other identifiable time period. Thus, tuples are expired and are removed if either (a) the tuples stored in a partition have reached the maximum specified number and a new tuple is received and the oldest tuple in the partition is expired, or (b) the tuple is received prior to a specified time range and is expired.

An application for a partition-by time/tuple-based sliding window is where a maximum number of tuples per partition and the time the tuple occurred is important. For example, in a continuous data stream for a stock trading desk, two streams of tuples are received with the data "tradeId," and time. The first stream indicates when a trade is initiated and the second stream indicates that the trade has completed. The two streams are joined to determine when a trade has been completed. The two streams are joined to determine when a trade has been completed. The application is to determine whether 90% of the trades in the last one hour are completed within five seconds.

An example of a trade would appear as a tuple received from the first stream with a tradeId of "1." A trade is completed when a tuple is received from the second stream also with a tradeId of "1." If a trade is initiated and completed in five seconds, then the trade is a success. Otherwise, the trade is not a success. One way to determine whether 90% of the trades in the last hour are completed within five seconds is by counting all of the trades in the last hour and determining how many of the trades are successful and how many are not successful.

If a partition-by window is used to determine the query, then a partition-by window may be created with partitions based on "tradeId" with the specified number of tuples stored as one. The specified number of stored tuples is one because only new tuples with a unique tradeId are of interest. Unfortunately, the partition-by window would grow and continue growing because tuples would not expire. For example, for a tuple with "tradeId" of "1," there is no further activity on this tuple and the partition and tuple would never expire. Thus, all tuples with a unique tradeId would be kept with a single tuple.

By forming a combination of the partition-by and time-based window, tuples may not expire based only on the number of tuples in a partition, but also if the tuple was not received within a specified time range. Thus, if a time-range was specified to only store tuples received in the last five seconds, then older tuples that would not expire based upon the specified number of tuples may expire and get discarded, adding an additional bound to the window.

In an embodiment, when a tuple with a new particular time is received or an indication of a current time is received by the stream processing server, then the stored tuples are traversed and those that are expired are and removed.

Data Structures of Partition-By Time/Tuple-Based Sliding Window

Figure 2:
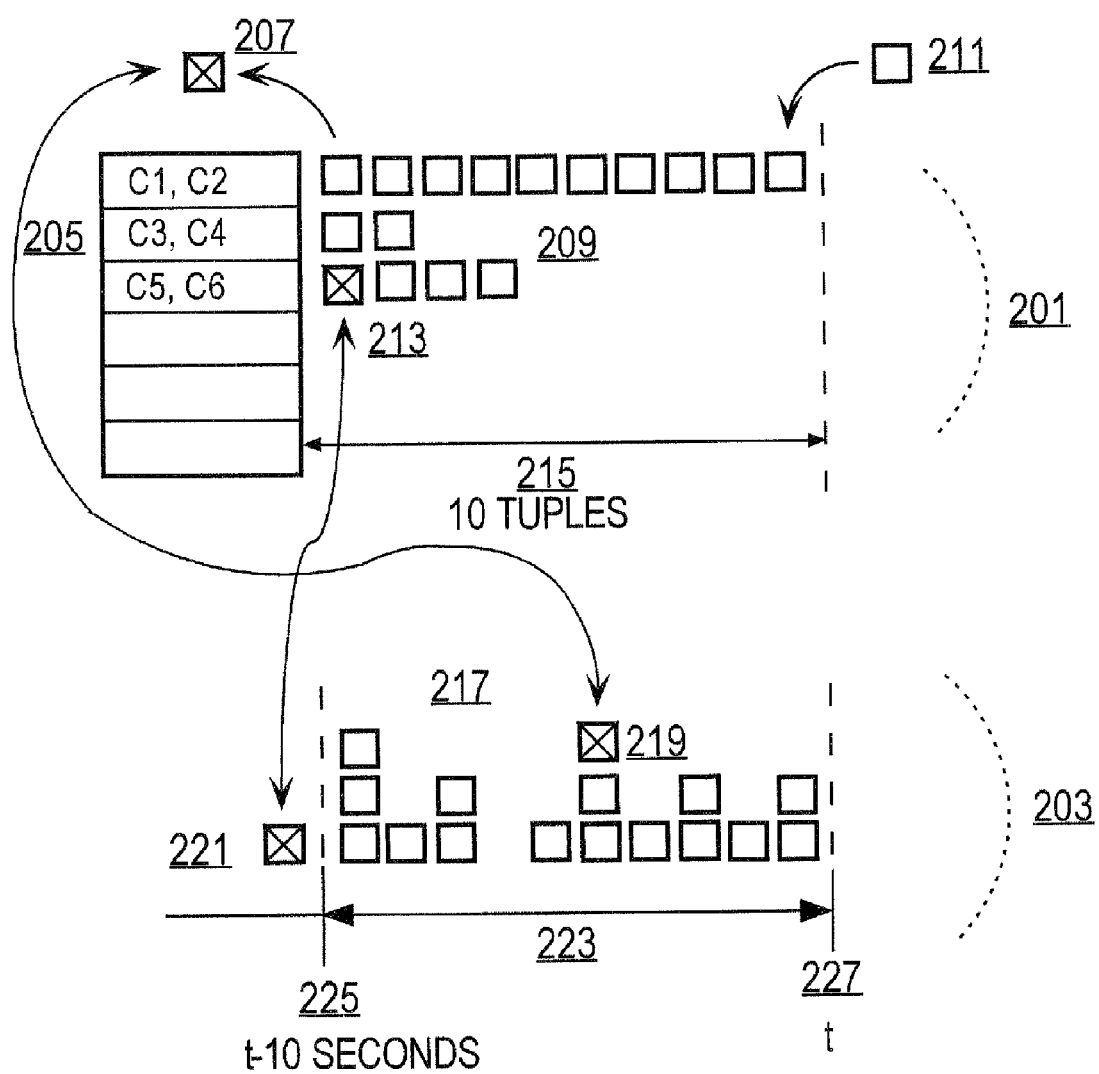
FIG. 2 is a diagram displaying a data structure used to implement the partition-by time/tuple-based sliding window, according to an embodiment of the invention.

In an embodiment, two data structures for employed and synchronized to implement a partition-by time/tuple-based sliding window as seen in FIG. 2. Tuples that are received are stored in both structure 201 and structure 203. The first structure 201 is similar to a partition-by sliding window. The first structure 201 is divided into partitions based on partition keys 203. In an embodiment, a hash index for each unique partition value key is used to implement the partitions. As used herein, a "hash index" is a data structure that associates keys with another data object. When given a particular key, a hash index is able to locate and store the corresponding data object for that particular key. A hash index is generated by first transforming the key value using a hash function into a hash. The hash is a number that is then used to index locations of associated data objects. In this particular case, the associated data objects are stored tuples from the continuous data stream.

A list of tuples 209 are appended to each partition key 205. Like a partition-by sliding window, each partition may only store a specified number of tuples. As seen in FIG. 2, the specified number of tuples is ten tuples 215. If a tuple is received 211 with the same value of a partition key and the partition is already storing the specified number of tuples, then the oldest tuple in the list 207 is expired. The new 211 tuple is then appended to the list.

In the second data structure 203, tuples are maintained and sorted by the tuples' associated time. The second data structure 203 is similar to a time-based sliding window because the tuples stored are within a specified time range. As seen in FIG. 2, the specified time range 223 is ten seconds. The second data structure has two boundaries. The "t" boundary 227 indicates the current time and where new tuples are received and stored. The "t-10 seconds" boundary 225 indicates the boundary where the time range ends. Tuples 217 are stored and sorted based upon the tuples' associated time. Tuples received prior to the specified time range 221 are expired and removed.

The two data structures are synchronized in order to implement the partition-by time/tuple-based sliding window. If a tuple is expired in the first data structure as seen with tuple 207, then the second data structure is traversed to find the corresponding tuple 219. If the tuple 219 is found in the second data structure 203, then the tuple 219 is expired and removed. Conversely, if a tuple has expired in the second data structure such as tuple 221, then the first data structure 201 is traversed to find the corresponding tuple 213. If the tuple 213 is found in the first data structure 201 (ie. the tuple has not already expired), then the tuple 213 is expired and removed.

Example of Execution of Partition-By Time/Tuple-Based Sliding Window

Figure 3:
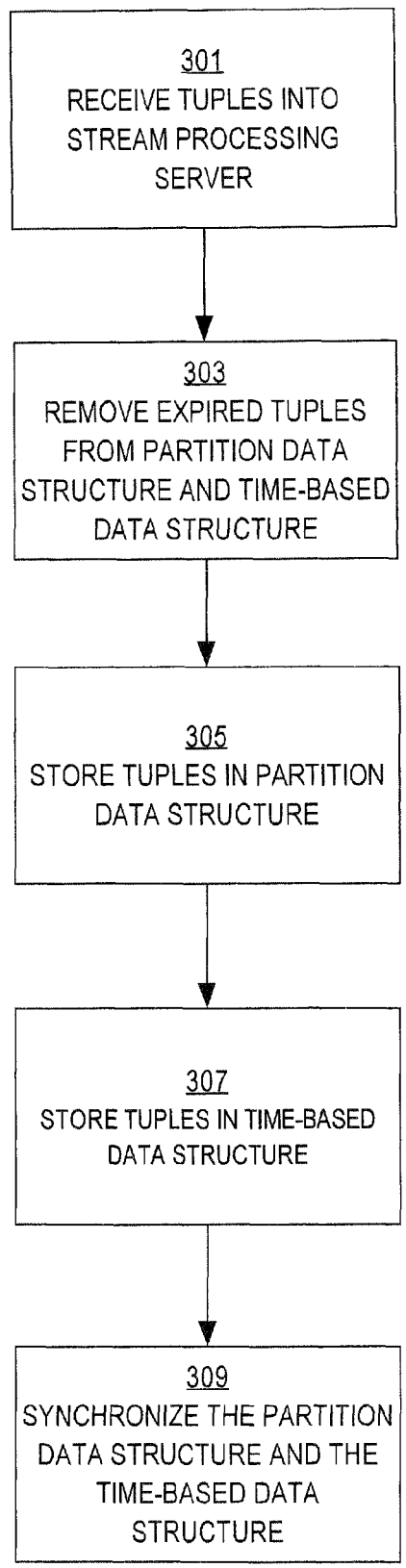
FIG. 3 is a flowchart diagram displaying the steps to execute a partition-by time/tuple-based sliding window, according to an embodiment of the invention.

FIG. 3 illustrates an example of the steps to execute a partition-by time/tuple-based sliding window, according at an embodiment. As used in this particular example, a "partition data structure" is a data structure where tuples are stored in partitions based upon unique partition keys. Each partition may only store a specified number of tuples. A "time-based data structure" is a data structure where tuples are stored sorted by the tuples' associated time and is bounded by a specified time range. In step 301, tuples are received by the stream processing server. In step 303, expired tuples are first removed from the partition data structure and the time-based data structure. Tuples are expired in the partition data structure if the number of tuples stored in a partition exceeds the specified number of tuples to be stored in the partition. The oldest tuple in the partition is expired. Tuples are expired in the time-based data structure if tuples stored are received prior to the specified time range. Tuples received prior to the specified time range are expired tuples. In step 305, tuples received are stored in the partition data structure based upon the data in the tuple and the partition key of the partition data structure. In step 307, tuples are stored in the time-based data structure. In step 309, the partition data structure and the time-based data structure are synchronized.

In an embodiment, expired tuples are removed from the time-based data structure and then the time-based data structure is synchronized with the partition data structure. Then, expired tuples are removed from the partition data structure and then the partition data structure synchronized with the time-based data structure. In another embodiment, the order is reversed and the partition data structure is processed first and then the time-based data structure is processed and synchronized.

In an embodiment, removal of tuples from a time-based data structure may be implemented by determining if any tuples are out of the specified time-range. Tuples out of the specified range are expired and removed from the time-based data structure. The tuples of the time-based data structure are then synchronized with the tuples stored in the partition data structure.

In an embodiment, removal of tuples from a partition data structure may be implemented by traversing the partition data structure to locate any tuples that are out of the specified number of tuples that may be stored in a particular partition. If any tuples are out of the specified number, the tuples are expired and removed from the partition data. The tuples of the partition data structure are then synchronized with the tuples stored in the time-based data structure.

Hardware Overview

Figure 4:
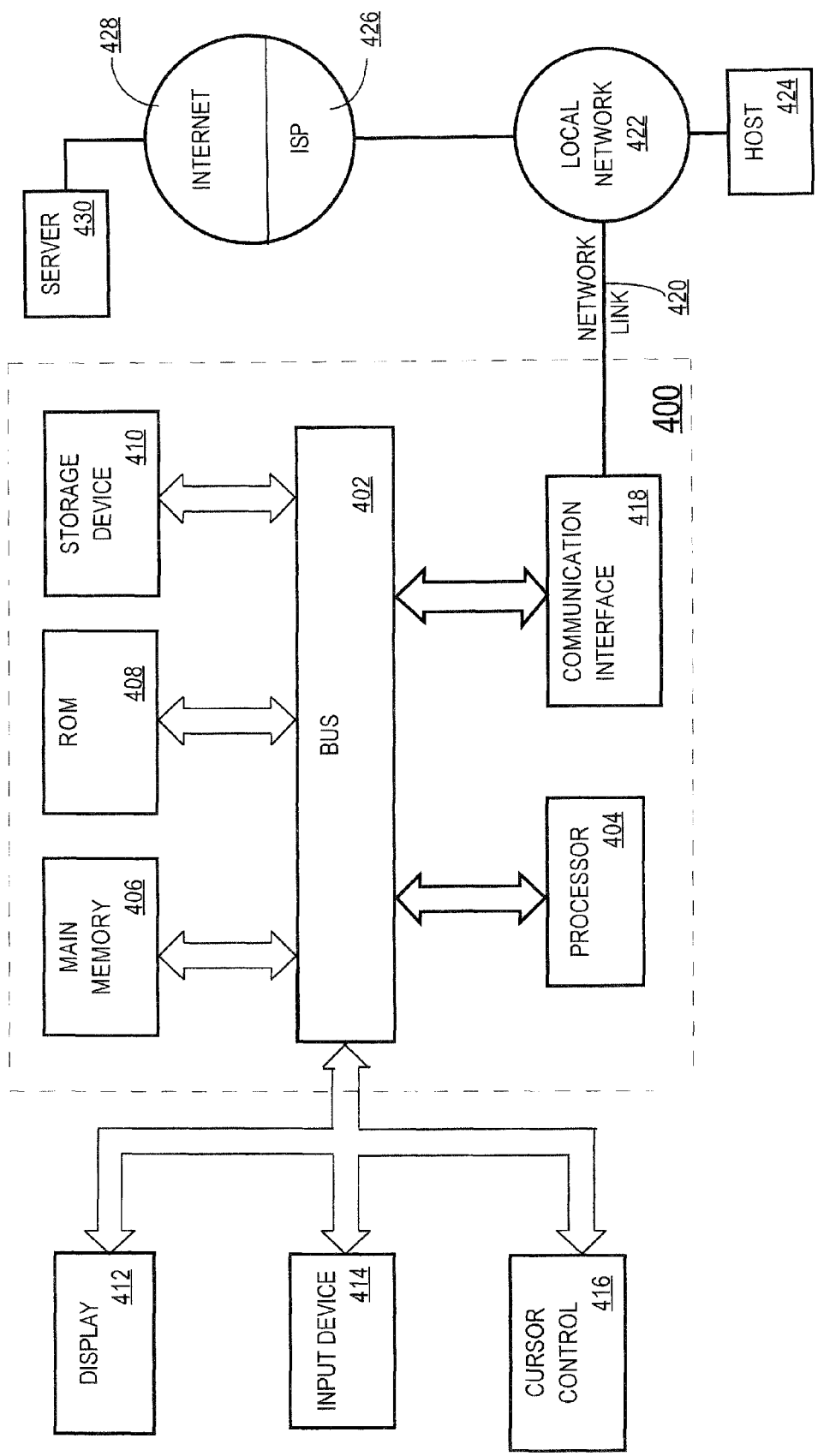
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:

receiving one or more continuous data streams that comprise a plurality of tuples of data, wherein each tuple, within the plurality of tuples of data, is associated with a particular time, wherein the particular time is no earlier than the time of any previously generated tuple in the plurality of tuples received;

retaining in partitions of a data structure the plurality of tuples that fall within a sliding time-based window, wherein the sliding time-based window is bounded by (a) a specified relative range of time and (b) a maximum number of tuples to retain;

wherein retaining in partitions of a data structure the plurality of tuples that fall within a sliding time-based window comprises:

in response to receiving a tuple from the one or more continuous data streams, performing:

(a) removing, from each particular partition of said partitions of said data structure, tuples that exceed a specified amount of tuples to be stored in each particular partition, wherein the partitions in the data structure are based upon one or more partition keys;

(b) removing, from each particular partition of said partitions of said data structure, tuples that are associated with a particular time that is not within the specified relative range of time; and (c) storing, in a particular partition among the partitions of the data structure, the tuple; and wherein the method is performed by one or more computing devices.

2. The method of claim 1, wherein the particular time for a tuple is based on the time that the tuple is received.

3. The method of claim 1, wherein the particular time for a tuple is based on an order in which the tuple is received.

4. The method of claim 1, wherein storing the tuple in the particular partition among partitions of the data structure is performed using a hash index.

5. The method of claim 1, further comprising:
registering a query based upon CQL; and
in response to receiving a tuple from the one or more continuous data streams, evaluating the query with the tuple.

6. A method comprising the steps of:
receiving one or more continuous data streams that comprise a plurality of tuples of data, wherein each tuple, within the plurality of tuples of data, is associated with a particular time, wherein the particular time is no less than the time of any previously generated tuple in the plurality of tuples received;
retaining in a data structure the plurality of tuples that fall within a sliding time-based window, wherein the sliding time-based window is bounded by (a) a specified relative range of time and (b) a maximum number of tuples to retain, wherein the data structure comprises a first data structure and a second data structure;
wherein retaining in a data structure the plurality of tuples that fall within a sliding time-based window comprises:
in response to receiving a tuple from the one or more continuous data streams, performing the steps of:
(a) removing, from each particular partition of a first data structure, tuples that exceed a specified amount of tuples to be stored in each particular partition;
(b) removing, from a second data structure, tuples that are associated with a particular time that is not within a range of time;
(c) storing, the tuple, in the first data structure and the second data structure,
wherein tuples stored in the first data structure are stored in a particular partition among partitions based upon one or more partition keys, and
wherein tuples stored in the second data structure are sorted by the particular time of the tuples; and
(d) synchronizing tuples stored in the first data structure with tuples stored in the second data structure; and
wherein the method is performed by one or more computing devices.

7. The method of claim 6, wherein the first data structure is a partition-by data structure.

8. The method of claim 6, wherein the second data structure is a time-based data structure.

9. The method of claim 6, wherein the particular time for a tuple is based on the time that the tuple is received.

10. The method of claim 6, wherein the particular time for a tuple is based in an order in which the tuple is received.

11. The method of claim 6, further comprising:
registering a query based upon CQL; and
upon receiving a tuple from the one or more continuous data streams, evaluating the query with the tuple.

12. A computer-readable storage medium carrying one or more sequences of instructions which, when executed by one or more processors, causes the one or more processors to perform:

receiving one or more continuous data streams that comprise a plurality of tuples of data, wherein each tuple, within the plurality of tuples of data, is associated with a particular time, wherein the particular time is no earlier than the time of any previously generated tuple in the plurality of tuples received;
retaining in partitions of a data structure the plurality of tuples that fall within a sliding time-based window, wherein the sliding time-based window is bounded by (a) a specified relative range of time and (b) a maximum number of tuples to retain; and
wherein retaining in partitions of a data structure the plurality of tuples that fall within a sliding time-based window comprises:
in response to receiving a tuple from the one or more continuous data streams, performing:
(a) removing, from each particular partition of said partitions of said data structure, tuples that exceed a specified amount of tuples to be stored in each particular partition, wherein the partitions in the data structure are based upon one or more partition keys;
(b) removing, from each particular partition of said partitions of said data structure, tuples that are associated with a particular time that is not within the specified relative range of time; and
(c) storing, in a particular partition among the partitions of the data structure, the tuple.

13. The computer-readable storage medium of claim 12, wherein the particular time for a tuple is based on the time that the tuple is received.

14. The computer-readable storage medium of claim 12, wherein the particular time for a tuple is based on an order in which the tuple is received.

15. The computer-readable storage medium of claim 12, wherein storing the tuple in the particular partition among partitions of the data structure is performed using a hash index.

16. The computer-readable storage medium of claim 12, further comprising:
registering a query based upon CQL; and
in response to receiving a tuple from the one or more continuous data streams, evaluating the query with the tuple.

17. A computer-readable storage medium carrying one or more sequences of instructions which, when executed by one or more processors, causes the one or more processors to:
receiving one or more continuous data streams that comprise a plurality of tuples of data, wherein each tuple, within the plurality of tuples of data, is associated with a particular time, wherein the particular time is no less than the time of any previously generated tuple in the plurality of tuples received;
retaining in a data structure the plurality of tuples that fall within a sliding time-based window, wherein the sliding time-based window is bounded by (a) a specified relative range of time and (b) a maximum number of tuples to retain, wherein the data structure comprises a first data structure and a second data structure; and
wherein retaining in a data structure the plurality of tuples that fall within a sliding time-based window comprises:
in response to receiving a tuple from the one or more continuous data streams, performing the steps of:
(a) removing, from each particular partition of a first data structure, tuples that exceed a specified amount of tuples to be stored in each particular partition;

(b) removing, from a second data structure, tuples that are associated with a particular time that is not within a range of time;

(c) storing, the tuple, in the first data structure and the second data structure, wherein tuples stored in the first data structure are stored in a particular partition among partitions based upon one or more partition keys, and wherein tuples stored in the second data structure are sorted by the particular time of the tuples; and (d) synchronizing tuples stored in the first data structure with tuples stored in the second data structure.

18. The computer-readable storage medium of claim 17, wherein the first data structure is a partition-by data structure.

19. The computer-readable storage medium of claim 17, wherein the second data structure is a time-based data structure.

20. The computer-readable storage medium of claim 17, wherein the particular time for a tuple is based on the time that the tuple is received.

21. The computer-readable storage medium of claim 17, wherein the particular time for a tuple is based in an order in which the tuple is received.

22. The computer-readable storage medium of claim 17, further comprising:

registering a query based upon CQL; and upon receiving a tuple from the one or more continuous data streams, evaluating the query with the tuple.

\* \* \* \* \*